May 30, 1967
G. M. BENSON
3,322,636
BREEDER NUCLEAR REACTOR
Filed July 22, 1964
2 Sheets-Sheet 1
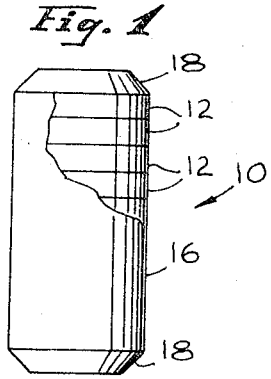
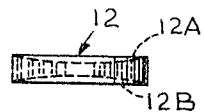
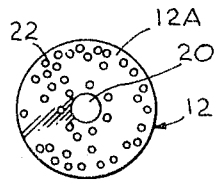
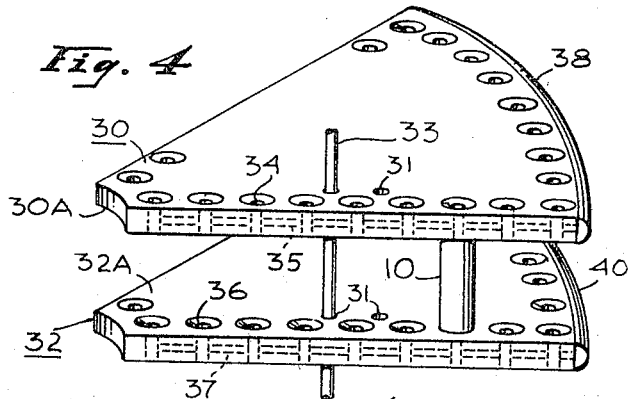
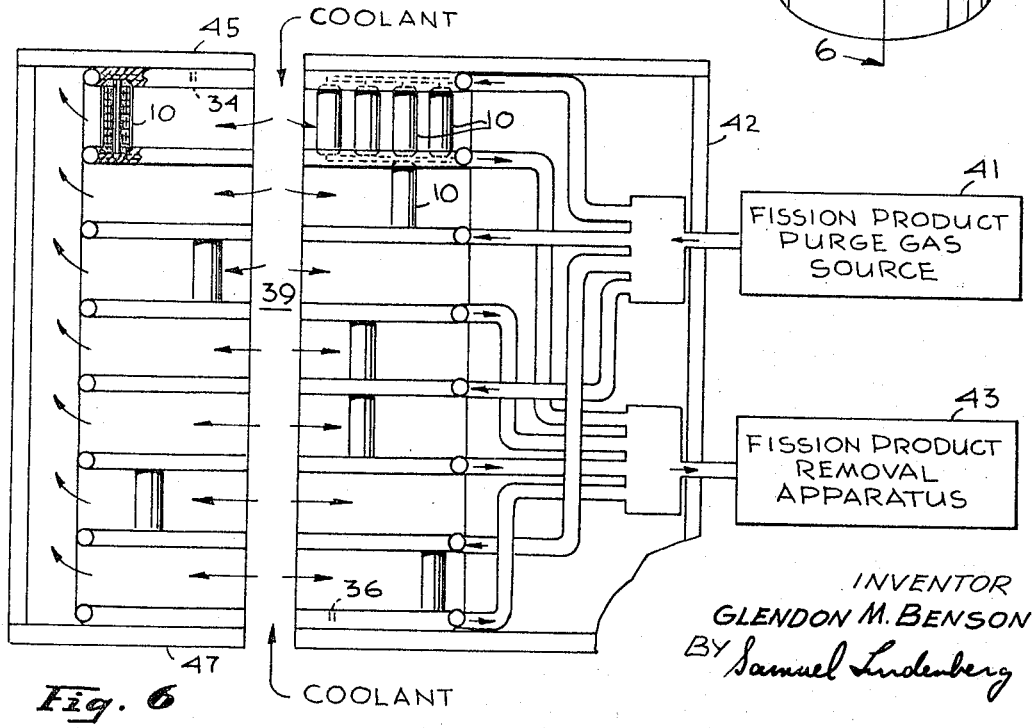
INVENTOR
GLENDON M. BENSON
BY Samuel Lindenberg
ATTORNEY INVENTOR
GLENDON M. BENSON
BY Samuel Lindenberg
ATTORNEY

United States Patent Office 3,322,636
Patented May 30, 1967

3,322,636
BREEDER NUCLEAR REACTOR
Glendon M. Benson, Danville, Calif., assignor to Physics International Company, Berkeley, Calif., a corporation of California
Filed July 22, 1964, Ser. No. 384,358
10 Claims. (Cl. 176—18)

This invention relates to nuclear breeder reactors and more particularly to improvements therein.

An in-situ nuclear breeder reactor may be defined as a reactor in which all of the fertile and fissile fuel (total fuel inventory) of the system is in the reactor and wherein all of the fuel is simultaneously subject to fission or conversion and wherein no fuel in the system is recycled during the system's lifetime through refueling, reprocessing, or storage for radioactive decay.

An object of this invention is the provision of a novel nuclear breeder reactor which continuously burns and breeds nuclear fuel in-situ.

Still another object of this invention is the provision of a nuclear breeder reactor which continuously breeds and burns fuel in-situ without the need for refueling, fuel recycling or reactor shut down for periods on the order of several decades.

Another object of the present invention is the provision of a nuclear breeder reactor wherein radiation damage which may occur within the core is annealed in-situ.

Yet another object of the present invention is the provision of a novel and unique nuclear breeder reactor wherein deleterious fission products are promptly removed.

Another object of the present invention is the provision of a nuclear breeder reactor wherein inert gas is heated to a sufficiently high temperature such that the gas may be utilized in a non-equilibrium magneto-hydrodynamic generator.

These and other objects of the present invention may be achieved in an arrangement comprising a plurality of graphite fuel elements each of which is homogeneously loaded with uranium and thorium carbide. Each fuel element is composed of a stacked array of sub-elements having capillary openings through which the fission products migrate and thereafter are transported by a low pressure inert gas through aligned openings in the core sub-elements which form a passage through the center of each stack. The fuel element sub-elements are supported in a manner to enable coolant flow around them for the most efficient transfer of the heat energy. The coolant comprises a gas, such as helium. This is an inert gas coolant which eliminates corrosion, and further by using refractory moderators, such as graphite or beryllium oxide, moderator and fuel vaporization and structural phase changes at elevated temperatures are eliminated. This perits a significantly higher operating temperature (from 2,000 to 2,500° K.) than is achievable in other reactors which are temperature limited by corrosion, moderator and fuel vaporization, and structural phase change. This higher temperature not only increases the kinetics of fission product migration and transport, but also increases the kinetics of annealing radiation induced dislocation and defect damage in the graphite cores. The increased kinetics of annealing leads to the complete thermal annealing of radiation damage within the fuel element and thereby removes the radiation damage within the fuel element and thereby removes the radiation damage restriction on fuel element lifetime, which presently limits the fuel element in many reactors.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a drawing of a core element with a portion of the pyrolytic coating removed for illustrating the structure of a stack of core sub-elements of which it is made.

FIGURES 2 and 3 are respectively side and plan views of a core sub-element.

FIGURE 4 is a perspective view illustrating the construction of plates for holding the core elements.

FIGURE 5 illustrates the appearance of the active portion of the breeder reactor with all the core segments fitted together.

FIGURE 6 is a view in cross section along the line 6—6 of FIGURE 5 illustrating the appearance of the breeder reactor and the circulation therethrough of coolant and fission product purge gas.

Figure 7:
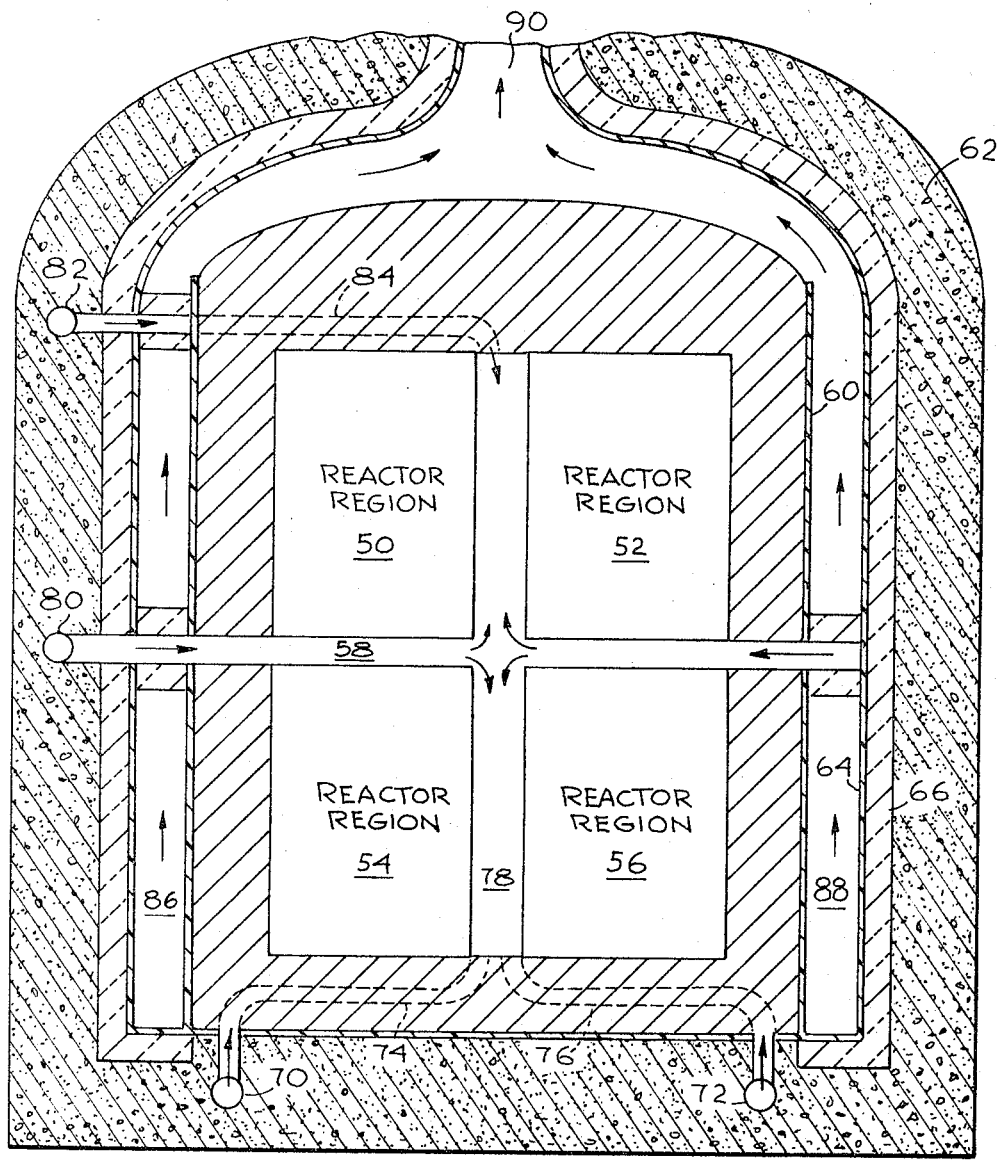
FIGURE 7 is a view in section of the completed reactor.

Referring now to FIGURE 1 there may be seen a drawing of a core element of the reactor with a portion of the pyrolytic coating removed for the purpose of showing the unique structure thereof. The core element 10 comprises a plurality of core sub-elements 12, 12, which are stacked one on top of the other. As shown in FIGURES 2 and 3 these core sub-elements may have a circular shape. However, this is to be considered by way of illustration and not by way of limitation. The shape of the fuel element may be whatever shape is suitable without departing from the spirit and scope of this invention. The core element 16 composed of the core sub-elements is preferably coated with pyrolytic graphite layers or any other suitable fission product diffusion barrier. This type of barrier is well known in the art. The end-caps 18 of the fuel element are made of graphite.

As shown in FIGURES 2 and 3, a core sub-element 12 has essentially a disc form with the upper and lower surfaces respectively 12A, 12B dished or curved so that the centers are closer to each other than the outer edges. A hole 20 is made through the center of the core sub-element. The core sub-element is a simple fully graphitized or pyrolytic graphite which is homogeneously loaded with uranium carbide and thorium. The uranium is the fissile fuel and the thorium is the fertile fuel which produces uranium in response to the bombardment by neutrons emitted by the fissioning of the uranium.

Each core sub-element has randomly dispersed over the surface thereof, a plurality of small holes 22 or micropores which are formed during fabrication. The core sub-elements are stacked one on top of another so that their center openings 20 form a continuous passage from the top to the bottom of the core element 10. The edges of adjacent sub-elements are in contact with one another and fuse with heat to seal and define a small chamber between sub-elements. The small micropore openings 22 open into the dished regions or chambers between the fuel sub-elements and which can communicate with the center opening 20 forming a passage through the core element 10. The core sub-element 12, 12, etc. are made of fully graphitized graphite having a predominant "a-axis" in the sub-element plane and a "c-axis" perpendicular thereto. Such graphite has a network of hexagonal atomic structures in the laminar plan (a-axis) and has the property that the undesired fission products diffuse between the laminar plane in the a-axis direction. Thus, this type of graphite enables the fission products to diffuse into the capillary openings 22 from whence, by reason of the chamber formed by dished surfaces of the core elements, the fission products diffuse to the central opening of the core element and thereby be removed by the inert purge gas.

The undesirable fission products migrate toward the center opening in the stack of core elements, to be thereafter removed. These fission products migrate for a number of reasons. One of these is that there exists a pressure gradient exerted by the helium coolant from outside of the core element which causes the fission products to flow toward the center opening. Second, there is a differential partial pressure of the fission products caused by the fission products being removed at the center of the core sub-element whereby the fission products move toward the center. Third, the diffusion barrier layer which is established by the multi-layer pyrolytic graphite coating, prevents fission product outward migration. Fourth, the temperature gradient which is established within the core element during the operation of the reactor, produces a chemical potential which transports the fission products toward the center opening.

The design of the reactor is simple and inexpensive. It is composed of a plurality of core elements, which are subject to automatic mass production methods, which contain therein internal fission product bleed-off passages. These blocks are simply stacked within internal pyrolytic graphite coatings or liners. As will appear further in this description, the cores are continuously purged by the bleed-off helium.

The advantage of using helium as a coolant, in addition to its being inert, is that it has a small parasitic neutron capture cross-section. A further advantage of the core element structure as described is that after 20 to 50 years (depending on operating parameters) of continuous power production, a fuel element may be removed and reprocessed. The major portion of the fertile fuel in the fuel element has been converted into fissile fuel, which either has been consumed by fissioning to produce energy or has been recovered from the fuel element. This fissile fuel so recovered is sufficient not only to load another reactor identical to the original, but in addition, is sufficient such that if sold may cover the costs of fuel element reprocessing and fuel inventory. The only direct cost for refueling then is that due to the purchase of additional thorium. This additional thorium replaces the thorium in the original reactor that was converted and consumed in-situ. In addition, the simple homogeneous solid state inexpensive fuel element is easy to reprocess and refuel so as to minimize the cost.

Finally, because of the significantly higher operating temperature (2,000 to 2,500° K.) which is permissible with this reactor, in view of the use of an inert gas coolant which eliminates corrosion, not only is the rate of fission product transport accelerated but also, the kinetics of annealing radiation induced dislocations and defects in the graphite elements is such that complete thermal annealing of radiation damage occurs within the core elements and thereby the usual radiation damage restriction on the fuel element lifetime is eliminated.

The self-annealing of radiation damage and the prompt removal of fission products, together with a high fertile fuel loading, increases both the breeder-core lifetime and the fuel burn-up to a level where core lifetimes equal the total plant economic lifetimes.

FIGURE 4 is a perspective view of a pair of holder plates 30, 32 between which core elements 10 are placed. As may be seen in the drawing the holder plates describe a sector of a circle. These holder plates have a plurality of tapered holes therethrough respectively 34, 36 which are regularly dispersed over the entire area of the plates. The opposed surfaces 30a, 32a have the holes tapered so that the top and bottom of the fuel element 10 may be conveniently held between two opposite holes. The holes are aligned with the opening 20 which extend through the core 10. Suitable interconnected openings form a network of passages internally within these plates. In addition, there are suitable holes 31 through these plates, which may be provided in a manner known to those skilled in the art, through which control rods 33 are inserted. Such control rods may contain a fertile material, such as any one of thorium oxide, thorium carbide, thorium tetrafluoride, natural uranium oxide, or natural uranium carbide which is converted into a fissible material in the process of controlling the reactivity of the reactor by absorbing neutrons from the fuel. Thus, the control rods, after being depleted of fertile fuel, contain valuable fissible fuel and therefore are saleable, instead of being discarded, as heretofore.

The holes 34 in the upper plate and the holes 36 in the lower plate represented by the dotted lines respectively 35, 37 respectively communicate with each other by internal passages which in turn lead to respective bleed-off rings 38, 40, which surround the outer periphery of the sector plates 30, 32. As will be shown later, a fission product purging gas can flow through the holes in the plates and then down through the central openings in the core elements formed by the holes 20 to purge the core elements and collect and remove the fission products.

Each one of the graphite plates may be formed conventionally or explosively as two separate symmetrical pieces which are then bonded together. In this manner, the internal passageway that connects all of the holes within a plate lead to the bleed-off ring. Thus the fission product bleed-off gas can circulate properly.

The plates, after being loaded with the core elements are stacked to form a cylindrical reactor with a centrally located hole as is shown in FIGURE 5. A compressive graphite fiber wound shell 42 serves to hold the stacked plates in place. As may be seen in FIGURE 6 which is a cross-sectional view of FIGURE 5 taken along the lines 6—6, each complete circle of plates is placed on top of another to complete a circle, thereby to provide a central coolant circulating passage. The circulation of the coolant is, as represented by the arrows. The coolant will flow in via the central plennum chamber 39 then through the passages between the core elements and out through an outer plennum chamber.

In order to remove unwanted fission products, an inert gas, such as helium, is applied at a low pressure from a source of an inert gas 41 to alternate collector rings of the plates. These may be considered the upper plates. The gas then flows through the communicating passageways in the plates, which are connected to the collector rings, down through the central holes in the core elements and then through the passageways in the lower plates to the collector rings. From here they pass to fission product removal apparatus 43, whereby techniques known to the art, the fission products as well as volatile gases are removed from the helium. The cleansed helium may then be returned to the fission product purge gas source 41, for reuse, if desired. It should be noted that the plates 34 and 36 at the very top and very bottom of the reactor core have a covering plate respectively 45, 47 over the holes through the plates so that the purge gas will not escape out of the ends of the reactor core.

The complete reactor is shown in FIGURE 7, which is a cross-section thereof. The rectangles 50, 52, 54, 56 which are designated as reactor regions actually comprise the halves of the stacks of plates. Thus the reactor regions 50, 52 and the reactor regions 54, 56 might constitute two of the arrangements shown in FIGURE 6 which are spaced apart by a coolant passage 58. As previously indicated, the entire reactor and reflector may be placed in a container comprising a compressive graphite fiber wound shell 60. The container is placed within another container which is a high density concrete shield 62. This may be cooled by water in a manner well known to the art. The inside of the concrete shield container may be lined with a pyrolytic graphite insulator material 64. Further, between this pyrolytic graphite insulator and the concrete shield itself there may be placed further insulation material well known for its further insulating qualties. The helium coolant is pumped into the reactor from pipes 70, 72 in the bottom of the concrete shield which communicate through pipes 74, 76 represented by dotted lines to the center opening 78 which extends through the entire reactor.

Further pipes 80, 82 within the concrete shield wall communicate with pipes respectively 58, 84 to pump coolant into the central opening 78. The coolant circulates in and out of the reactor region in the manner described in connection with FIGURE 6, and is finally collected by means of suitable pipes, not shown, in the regions 86, 88, which comprise the space between the compressive graphite fiber wound shell and the walls of the concrete shield container. This coolant, which is only heated, rises over the reactor through an exit passage 90 where the heat may be extracted from the coolant in any known manner after which the coolant is recirculated.

The safety problems of a reactor built in accordance with the concept described, are no more difficult than those of present-day reactors for a number of reasons. First, the effect of Doppler broadening of $Th^{232}$ resonances is greater than that of $U^{233}$ and $U^{235}$, due to the high thorium loading, and leads to a negative temperature coefficient. Further, the migrational loss rate of delayed neutron procursors is low enough such that their mean residence time in the core is longer than their mean half-life. Therefore, reactivity control may still be based on delayed, rather than prompt, neutrons. Also, the control swing required for a negative temperature coefficient compensation and for excess K effective, due to $U^{233}$ build-up, is large but stable and of long time period since there is no routine need for reactor temperature change or fuel mass modification during core lifetime. Further, the release of radioactive nuclides in credible reactor accidents is minimized by the following: The fission products are continuously and promptly removed from the core via a separate low pressure bleed-off system. This system powered by primary coolant bleed-off, is inherently leak safe. The fission products may be transferred to a distant storage and disposal area where they decay and may be used in an irradiation facility or they may be prepared for disposal. The fertile and fissile fuels, the other actinide metals and any core-contained fission products are in carbide form and have a very low vapor pressure and diffusivity, even under accidental core melt-downs. These nuclides should be easily contained by a modest containment vessel (due to the low nuclide vapor pressure and coolant gas pressure). Such a vessel may be provided with spray nozzles and foam generators which blanket the reactor with a thermo-setting plastic. Finally, the low pressure primary coolant loop has a minimum of radio-activity due to the following: The fission product concentration in the coolant (caused by fission fragment capture within the core coolant passages) is negligible due to a 100 or 200 micron thick impervious coolant passage liner and the prompt removal of fission products from the coolant by scrubbing and cold-trapping. The primary coolant, helium, is exceptionally inert to neutron-induced reactions. The high primary circuit temperature implies negligible fission product condensation within the circuit.

The high core temperature produced by the in situ breeder reactor described herein, raises the temperature of the inert coolant gas to a value at which it is practical to generate power by a magneto-hydrodynamic generator, incorporating non-equilibrium ionization.

Accordingly, there has been described and shown herein a novel, high temperature inert gas-cooled graphite, homogeneous fertile and fissile fuel loaded, in situ breeder reactor which cleanses itself of most fission products and thermally anneals radiation-induced damage. While the fissile and fertile fuels have been indicated as uranium and thorium, this is exemplary and not limiting. For example, the fissile fuel may be plutonium and the fertile fuel may be natural uranium.

What is claimed is:

1. A breeder nuclear reactor comprising a plurality of fuel elements, each fuel element being rod shaped and having a hole extending through the longitudinal axis thereof, each fuel element having homogenously dispersed therethrough a fissile fuel and a fertile fuel, means for holding said plurality of fuel elements substantially parallel, spaced from one another and in several layers comprising a plurality of spaced plates having an axis of symmetry and a hole through all of said plates through said axis of symmetry, said plurality of spaced plates having a plurality of aligned openings therein for supporting therebetween said plurality of fuel elements, a source of a coolant gas, means for circulating said coolant gas from said source up through the axis of symmetry and outward between the plurality of spaced plates to the outside edges of said spaced plates for return therefrom to said source of coolant gas, said fuel element holes having a noncommunicating relationship with said coolant gas source, an inner container comprising a compressive graphite fiber wound shell enclosing said plurality of spaced plates, and a high density concrete shield enclosing said compressive graphite fiber wound shell.

2. A breeder nuclear reactor as recited in claim 1 wherein said coolant is helium.

3. A breeder nuclear reactor as recited in claim 1 wherein said fissile fuel is uranium and said fertile fuel is thorium.

4. A breeder nuclear reactor as recited in claim 1 wherein each said fuel element comprises a stack of aligned cylinders, the two opposed surfaces of each said cylinder being concave, a hole extending through each cylinder along its axis, a plurality of randomly dispersed micropores scattered through each said cylinder, and a fissile fuel and a fertile fuel homogeneously dispersed through said cylinder.

5. A breeder nuclear reactor comprising a plurality of fuel elements each fuel element having an axis of symmetry and having a hole extending through the axis, each element having homogeneously dispersed therethrough a fissile fuel and a fertile fuel, means for holding said plurality of fuel elements disposed over a predetermined area comprising an upper plate, a lower plate spaced opposite said upper plate, said upper plate and lower plate having a plurality of opposed openings therein for supporting said plurality of fuel elements between said upper and lower plates, a first plurality of passageways in said upper plate extending transversely from one edge of said upper plate and communicating with one end of each of the holes extending through said fuel elements, a second plurality of passageways in said lower plate extending transversely from one edge of said lower plate and communicating with the other end of each of the holes extending through said fuel elements, a source of a substantially inert fission product purge gas, and means for causing said gas to flow from said source through said first plurality of passageways, through said fuel elements and through said second plurality of passageways.

6. A breeder nuclear reactor comprising a plurality of fuel elements each fuel element having an axis of symmetry and having a hole extending through the axis, each element having homogeneously dispersed therethrough a fissile fuel and a fertile fuel, means for holding said plurality of fuel elements disposed over a predetermined area comprising an upper plate, a lower plate spaced opposite said upper plate, said upper plate and lower plate having a plurality of opposed openings therein for supporting said plurality of fuel elements between said upper and lower plates, a first plurality of passageways in said upper plate extending transversely from one edge of said upper plate communicating with one end of each of the holes extending through said fuel elements, a second plurality of passageways in said lower plate extending transversely from one edge of said lower plate communicating with the other end of each of the holes extending through said fuel elements, a source of substantially inert fission product purge gas, means for causing said gas to flow from said source through said first plurality of passageways, through said fuel elements and through said second plurality of passageways, a container enclosing said supported plurality of fuel elements, a substantially non-corrosive fluid coolant, and means for circulating said coolant around the side of said fuel elements between said upper and lower plates and out of said enclosing container for affording a heat exchange.

7. A breeder nuclear reactor comprising a plurality of fuel elements, each fuel element including an aligned stack of a plurality of core sub-elements made of graphite, each having essentially a disc shape with the two opposed surfaces of said disc being concave, a hole along the axis of each disc, a plurality of randomly dispersed micropores randomly scattered about said hole, said core sub-elements being stacked on top of one another to align said relatively large holes to provide a passage through the fuel element, a fissile and a fertile fuel homogeneously disposed through each fuel element, and a container of pyrolytic graphite for each fuel element enclosing all but the openings of each said passage through said fuel elements, means for holding said fuel elements disposed over a predetermined area comprising an upper plate, a lower plate spaced opposite said upper plate, said upper and lower plates having a plurality of opposed openings distributed over their surfaces for supporting said plurality of fuel elements between said upper and lower plates, a purge gas collector passageway at the outside edge of each of said upper and lower plates, a plurality of passageways extending between holes in each of said upper and lower plates and extending to the respective purge gas collector passageways of the respective upper and lower plates, a purge gas means for circulating said purge gas into said collector passageways and through said fuel elements, a coolant gas, and means for circulating said coolant gas around the containers of said fuel elements.

8. A breeder nuclear reactor as recited in claim 7 wherein said upper and lower plates are made of graphite.

9. A breeder nuclear reactor as recited in claim 7 wherein in each fuel element said discs are each made of fully graphitized graphite with an A-plane extending at right angles to the axis.

10. A breeder nuclear reactor as recited in claim 7 wherein said upper and lower plates describe an arcuate section, a plurality of said arcuate sections are fitted together to describe a circle, and a plurality of said fitted together arcuate sections being spaced from one another by the fuel elements held therebetween.

References Cited

UNITED STATES PATENTS

| | | | |
|---|---|---|---|
| 2,851,409 | 9/1958 | Moore | 176—37 |
| 2,992,174 | 7/1961 | Edlund et al. | 176—30 |
| 2,996,444 | 8/1961 | Simnad | 176—68 |
| 3,009,869 | 11/1961 | Bassett | 176—93 |
| 3,010,889 | 11/1961 | Fortescue et al. | 176—37 |
| 3,028,330 | 4/1962 | Justheim et al. | 176—90 |
| 3,033,773 | 5/1962 | Schuderberg et al. | 176—59 |
| 3,091,581 | 5/1963 | Barr et al. | 176—69 |
| 3,103,479 | 9/1963 | Ransohoff | 176—86 |
| 3,129,142 | 4/1964 | Chernock | 176—69 |
| 3,141,827 | 7/1964 | Iskenderian | 176—17 |
| 3,141,829 | 7/1964 | Fortescue et al. | 176—68 |
| 3,146,173 | 8/1964 | Fortescue et al. | 176—90 |
| 3,149,048 | 9/1964 | Bevilacqua | 176—86 |
| 3,154,471 | 10/1964 | Radkowsy | 176—17 |
| 3,197,376 | 7/1965 | Balent et al. | 176—18 |
| 3,207,670 | 9/1965 | Fortescue et al. | 176—37 |
| 3,210,253 | 10/1965 | Hungtington | 176—18 |
| 3,214,343 | 10/1965 | Natland | 176—22 |

CARL D. QUARFORTH, *Primary Examiner.*

L. DEWAYNE RUTLEDGE, *Examiner.*

J. V. MAY, H. E. BEHREND, *Assistant Examiners.*